United States Patent [19]

Yoshimura

[11] Patent Number: 4,685,795

[45] Date of Patent: Aug. 11, 1987

[54] DOCUMENT SCANNING APPARATUS

[75] Inventor: Tsuyoshi Yoshimura, Tokyo, Japan

[73] Assignee: Ricoh Company, Ltd., Tokyo, Japan

[21] Appl. No.: 850,822

[22] Filed: Apr. 11, 1986

[30] Foreign Application Priority Data

May 2, 1985 [JP] Japan .................................. 60-94649

[51] Int. Cl.⁴ .......................................... G03G 15/00
[52] U.S. Cl. ..................................... 355/8; 355/3 R; 355/14 R
[58] Field of Search .................... 355/8, 3 R, 14 R, 11, 355/77

[56] References Cited

U.S. PATENT DOCUMENTS 4,171,901 10/1979 Takizawa et al. ........................ 355/8
4,183,656  1/1980 Ishihara et al. .......................... 355/8
4,188,028  2/1980 Miciukiewicz ..................... 355/8 X
4,355,883 10/1982 Landa ...................................... 355/8

Primary Examiner—A. C. Prescott
Attorney, Agent, or Firm—Oblon, Fisher, Spivak, McClelland & Maier

[57] ABSTRACT

A document scanning apparatus including a light source, first and second optical scanner systems optically coupled in series, an image forming lens supported on a lens support member including a lens base and a driving system including pulleys and driving wires, for moving the first and second optical scanner systems relative to each other and the lens. For the purpose of re-establishing a predetermined alignment of the first and second optical scanner systems in relation to the lens, such as might become necessary upon a breakage or stretching of a driving wire, for example, the first and second optical scanner systems are each provided with at least one reference point defining hole, and the lens base is provided with corresponding reference point holes. Then in the event that adjustment of the positions of the first and second optical scanner systems becomes necessary, the requisite positional alignment can be obtained by aligning the reference point holes of the first and second optical scanner systems with the corresponding reference point holes provided on the lens base. In this way, factory alignment settings can be quickly re-established in the field.

18 Claims, 12 Drawing Figures

FIG. 1
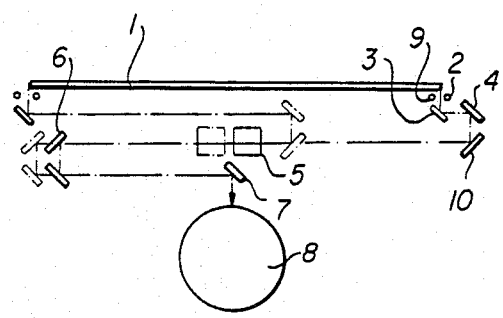
FIG. 2
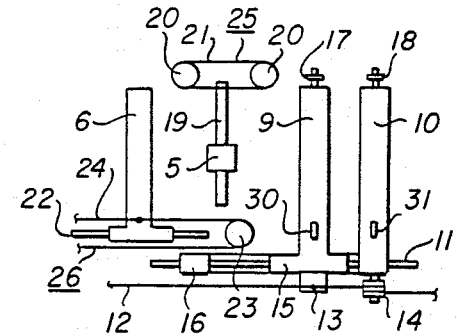
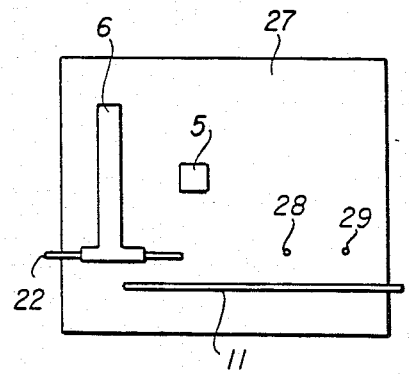
FIG. 3

DOCUMENT SCANNING APPARATUS

BACKGROUND OF THE INVENTION

1. Field of the Invention

This invention relates to a document scanning apparatus such as, for example, one to be used in a copying machine, facsimile machine, image scanner or the like.

2. Discussion of Background

In a copying machine of the above-noted type, there is typically provided a lamp, a first optical scanner system including a first mirror and a second optical scanner system including a second mirror for illuminating an original during a scanning time. The first and second optical scanner systems are moved in the same direction at a 2:1 speed, so that the length of the optical path from the original to a photoconductive member is kept constant at all times, whereby an accurate image of the original is formed on the photoconductive member. In a copying machine capable of changing the magnification of a copying image, a lens moving mechanism and a mirror moving mechanism are provided in order optically downstream of the second optical scanner system to move a lens and mirrors according to a selected magnification ratio.

In such a document scanning apparatus, the mirrors of the first and second optical scanner systems should be mounted in perpendicular relationship with the lens. This perpendicular relationship of the mirrors with respect to the lens is produced by using a guide rod and arranging a bearing coupling the guide rod at a right angle relative to the mirrors of the first and second optical scanner systems. During assembling, an adjustment of the focus and the magnification ratio is done such that a standard chart is placed at a location where an image of the original is to be formed. Then an image of the standard chart is projected back to the location where the original is placed, and the length of optical path is adjusted by changing the position of the lens and/or the position at which a driving wire is clamped to the first optical scanner system.

However, even if the first and second optical scanner systems and the lens are respectively located at the best possible focusing positioss in the document scanning apparatuqe, when this document scanning apparatus is used in the field, misadjustment or accidents such as produced, for example, by breaking orstretching of a driving wire may happen. In these cases, it is necessary to replace and/or reclamp the driving wire and then to readjust the focus.

But in a prior art document scanning apparatus, the reclamping and focus readjusting unavoidably relys on the sixth sense of the servicemen, who must determine the correct clamping position by a trial and error process including making a copy of an image, reviewing the copied image, making an adjustment and then repeating this cycle.

On the other hand, it is not practical to uses the alignment and focus technique employed in the origincl factory assembly of the scanner apparatus in the field, because to do so would require a significant amount of extra equipment to be at the disposal of the servicemen, not to mention the problem of transporting the extra equipment to the user's site in the field, even if it were assumed that the extra equipment were available.

SUMMARY OF THE INVENTION

Accordingly, one object of this invention is to provide a novel document scanning apparatus having an alignment member for aligning an optical scanner system with a lens.

It is another object of this invention to provide a simple and inexpensive document scanning apparatus capable of aligning an optical scanner system with a lens.

It is further another object of this invention to provide a document scanning apparatus capable of determining the position of the first and second optical scanner systems accurately during readjusting of a driving wire.

These and other objects of this invention are achieved by providing a new and improved document scanning appartus, including a lens support member having first and second reference point defining means, a first optical scanner system having a third reference point defining means and a second optical scanner system having a fourth reference point defining means, capable of easily determining the correct position of the first, and second optical scanner systems even if the driving wire is broken or is stretched in the field simply by alignment of the first and third reference points and the second and fourth reference points

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic side view of a first embodiment the optical system according to the present invention;

FIG. 2 is a schematic plan view of the driving system of the optical system as shown in FIG. 1;

FIG. 3 is a plan view of the lens base which supports the lens, support and lens shown in FIG. 2;

DESCRIPTION OF THE PREFERRED EMBODIMENT

Figure 4:
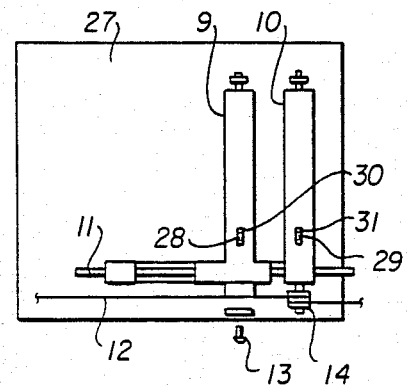
FIG. 4 is a plan view showing the apparatus of the invention undergoing alignment.
Figure 5:
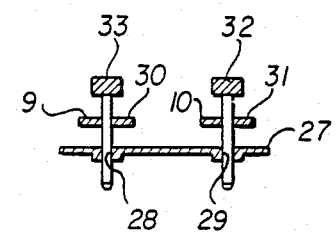
FIG. 5 is a vertical cross-sectional view of alignment tools inserted into alignment holes provided to align the first and second optical scanner systems with the lens base according to the invention.

Referring now to the drawings, wherein like reference numerals designate identicial or corresponding parts throughout the several views, and more particularly to FIG. 1 thereof, the principal structure of an optical system will be described. Under the contact glass 1 on which the original to be copied is placed is provided a light source 2 such as a lamp for illuminating the original. A first mirror 3 receives light reflected from the original and reflects light to two second mirrors 4, a lens 5, two third mirrors 6 and the fourth mirror 7 such that the light is focused on a photoconductive member 8 at a light receiving location. The lamp 2 and the first mirror 3 are mounted on a first optical scanner system 9. The first optical scanner system 9 is capable of moving reciprocately in order to scan the original. A second optical scanner system 10 includes the second mirrors 4. In order to keep the length of the optical path constant during the time of scanning the original, the first and second optical scanner systems 9, 10 are so arranged that the first optical scanner system 9 moves at a speed V and the second optical scanner system 10 moves at a speed V/2 in the same direction as that of the first optical scanner system 9. The lens 5 is movably mounted on a lens support 19 which is fixedly mounted on a lens base 27. The lens 5, lens support 19 and lens base 27 are moved together by lens moving mechanism 25, whereby the lens 5 is movable for changing the magnification ratio or adjusting the focus. Ihe third mirror 6 is also movable for changing the magnification by adjusting the length of the optical path.

Next, a method for moving the above-described optical units will be described referring to FIG. 2. In this embodiment, a one side driving system using a guide rod 11 is provided, and a driving wire 12 for moving the first and second optical scanner systems 9, 10 is provided. This driving wire 12 is clamped with one end of the first optical scanner system 9 by a wire clamp 13, and is turned over a movable pulley 14 which is mounted on one end of the second optical scanner system 10 in order to maintain the speed relationship of the first and second optical scanner systems 9, 10 at 2:1. The first and second optical scanner systems 9, 10 respective guide rollers 17, 18 are moved along a guide rail (not shown). The lens 5 is mounted on the lens support 19 which is connected with the lens driving wire 21 extending between rollers 20, 20, and the lens 5 is movable by rotation of the roller 20 which is driven by a lens motor (not shown). The third mirror 6 is freely movable along a guide rod 22 and is connected with a mirror driving wire 24. The mirror driving wire 24 is turned over a roller 23 which is rotated by a mirror driving wire 24. Thus, a lens moving mechanism 25 for moving the lens 5 and a mirror moving mechanism 26 for moving the mirror 6 are independent of the moving mechanism for the first and second optical scanner systems 9, 10.

Now, the positions of the third mirror 6 and the lens 5 which define the length of the optical path for the standard magnification ratio are determined respectively by sensors (not shown). For example, m=1 can be set as occasion demands.

Further, the amount of error of the conjugate length of the lens 5 can be corrected by adjusting the position of the sensor (not shown), as is well known to those skilled in the art.

According to this embodiment, two reference points defined by alignment holes 28, 29 are formed on the lens base 27 as shown in FIG. 3. The lens base 27 is movably supported on the body of the document as above noted. Therefore, the lens 5, the lens support 19 and the lens base 27 are moved together. These alignment holes are located at a predetermined relationship with respect to the position of the lens 5 when the lens 5 is mounted at a predetermined location on the lens base 27, e.g., at the standard position which is a predetermined distance from a home position of the first and second optical scanner systems 9, 10. The alignment holes 28, 29 are used for determining the correct positions of the first and second optical scanner systems 9, 10 in relation to the lens 5 to produce a focused image. Further reference points defined by alignment holes 30, 31 respectively corresponding to the alignment holes 28, 29 are formed on the first and second optical scanner systems 9, 10.

The locations of the reference point alignment holes, as above described, define the optical relationship of the positions of the first and second optical scanner systems 9, 10 and the lens 5, as previously determined during factory assembly of the apparatus. But, suppose that the driving wire 12 is broken in the field. First, after this broken driving wire 12 is replaced by a new one, the tool 32 is inserted into both reference holes 29, 31 so as to produce coincidence between the reference hole 31 which is formed on the second optical scanner system 10 and the reference hole 29 which is formed on the lens base 27, whereby the position of the second optical scanner system 10 in relation to the lens 5 is correctly determined. Then, the tool 33 is inserted into both reference holes 28, 30 so as to produce conicidence between the reference hole 30 which is formed on the first optical scanner system 9 and the reference hole 28 which is formed on the lens base 27, whereby the position of the first optical scanner system 9 in relation to the lens 5 is correctly determined. Then, the driving wire 12 is fixedly connected or clamped to the first optical scanner system 9 by the wire clamp 13 as shown in FIG. 4.

According to the apparatus above described, the position of the first optical scanner system 9 can be determined accurately and easily when reference hole 31 of the second optical scanner system 10 is aligned with the reference hole 20. Thus, even if the first and second optical scanner systems 9, 10 are located far from the primary adjusted position, the position of the first and second optical scanner systems 9, 10 can be accurately readjusted to the original position by using the tools 32, 33. As a result, maintenance work can be easily accomplished.

Figure 6:
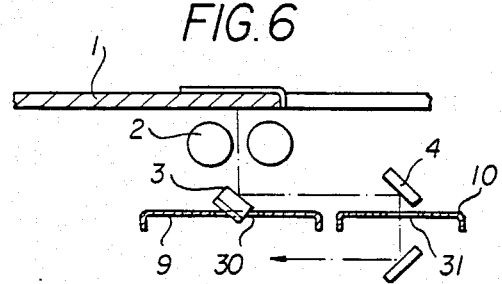
FIG. 6 is a partially enlarged side view of the optical system according to the invention.

The mirrors 3, 4 of the first and second optical scanner systems 9, 10 are arranged perpendicular to the guide rod 11. It is desirable that the reference holes 30, 31 are formed on a line coincident with the longitudinal axis of light beam where the light beam is reflected by the mirrors 3, 4 as shown in FIG. 6. However, if the relative positions of the reference holes 30, 31 with respect to the longitudinal axis of the light beam are kept constant, the reference holes 30, 31 can be formed at any other places. In any event, it is the recent trend that the optical scanner is made of one piece construction, that is, several optical units are integrated together. According to this production technique, the position of the mirror support members can be determined by making the reference holes 30, 31 for a standard of working, whereby the relationship of the positions between the mirror support members and the reference holes 30, 31 can be produced more accurately.

Further, the lens moving mechanism 25 and the mirror moving mechanism 26 are independent from the driving mechanism for the first and second optical scanner systems 9, 10. Acordingly when the first and second optical scanner systems 9, 10 are located at the original standard position, the focus condition and magnification which are independently set from the first and second optical scanner systems 9, 10 are automatically reproduced. That is, the mere determination of the positions of both the first and second optical scanner systems 9, 10 enables production of the originally set optical conditions such as focus magnification, for example, i.e., the optical conditions set at the time the document scanning apparatus is shipped from the factory.

Next, a second embodiment of the present invention will be described referring to FIGS. 7 to 10. This embodiment shows an optical scanning apparatus according to the invention wherein both sides of the first and second optical scanner systems 9, 10 are driven. First, the wire clamps 35a, 35b are provided on the both ends of the first optical scanner system 9, and the movable pulleys 36a, 36b are provided on the both ends of the second optical scanner system 10. The first optical scanner system 9 is driven by a driving pulley 37 which is driven by a motor or the like (not shown). The pulley 37 is located outside of the optical scanning path of the first and second optical scanner systems 9, 10. Fixed pulleys 38a and 38b are intercoupled with the driving pulley 37 by means of driving wire 39 which is clamped to opposite ends of the first optical scanner system 9 by means of clamps 35a, 35b. The driving wire 39 is extended from a stationary base 50a, turned around a movable pulley 36a on the one end of the second optical scanner system 9 and respectively turned around pulleys 38a, 37, 38b and 36a before being connected to stationary base 50b. The both ends of this driving wire 39 are fixedly attached to the respective stationary base 50a, 50b, as shown. Also provided are driving wires 40a, 40b. The one end of the driving wire 40a is fixedly attached to the stationary base 41b via spring 42. The driving wire 40a extends from spring 42, is turned around the pulley 38g, extends to and is turned around the pulley 36b at the other end of the second optical scanner system 10, extends around the pulleys 38f, 38c and the driving pulley 37 to which the other end of the driving wire 40a is fixedly attached. On the other hand, the one end of the driving wire 40b is fixedly attached to the stationary base 41a. The driving wire 40b extends from base 41a, is turned around the pulleys 36b, 38e, 38d and the driving pulley 37, to which the other end of the driving wire 40b is fixedly attached.

Figure 8:
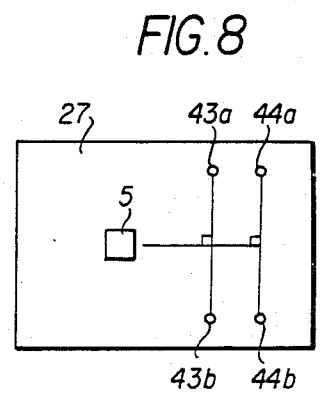
FIG. 8 is a plan view of the lens base according to another embodiment of the invention.

Four reference holes 43a, 43b, 44a, 44b are formed on the lens base 27 as shown in FIG. 8. These reference holes 43a to 44b are formed so as to define the predetermined positional relationships of the first and second optical scanner systems 9, 10 and the lens 5 during fabrication of the lens base 27. However, in this embodiment both sides of the first and second optical scanner systems 9, 10 are driven without using a guide rod. Thus, there is no means for defining the perpendicular angle between the mirrors and the optical axis of the lens 5. Therefore, pairs of reference holes are formed in the lens base 27 such that straight lines between the reference hole pairs 43a, 43b and 44a, 44b are perpendicular to the optical axis of the lens 5. Reference hole pairs 45a, 45b and 46a, 46b corresponding to the reference hole pairs 43a, 43b and 44a, 44b are formed on the first and second optical scanner systems 9, 10 respectively.

Figure 7:
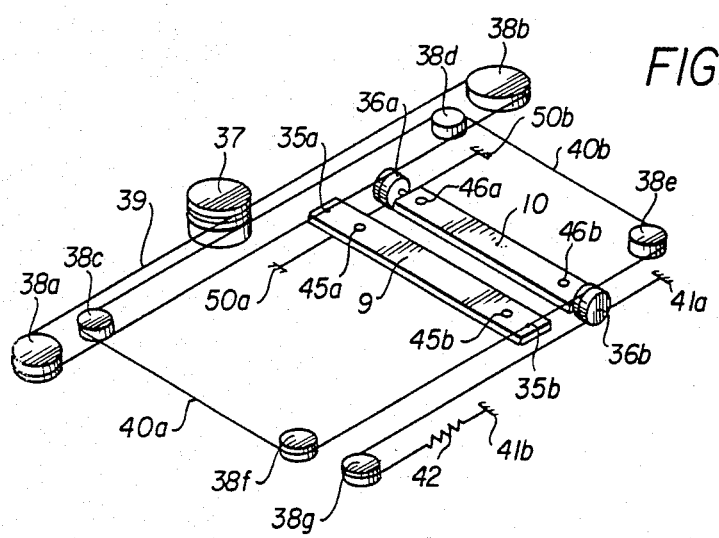
FIG. 7 is a perspective view showing a second embodiment of the driving system according to present invention.
Figure 9:
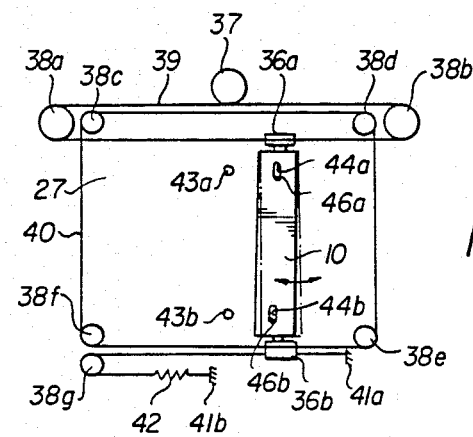
FIG. 9 is a plan view illustrating the adjustment of the position of the second optical scanner system according to the second embodiment shown in FIG. 7.

Next described is how the reference holes of the invention are used in aligning the first and second optical scanner systems 9, 10 shown in FIGS. 7 to 9. In this embodiment, the first and second optical scanner systems 9, 10 are driven at opposite ends thereof and are arranged perpendicular to the optical axis of the lens 5 without using a guide rod. The reference holes 46a, 46b of the second optical scanner system 10 are coincident with the reference holes 44a, 44b of the lens base 27 after wiring the driving wires 39, 40a, 40b around the pulleys 36a, 36b, 37 and 38a to 38g.

Figure 10:
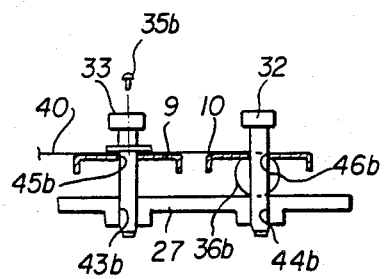
FIG. 10 is a vertical cross-sectional view of the alignment tools inerted into alignment holes of the second embodiment shown in FIG. 7.

First, the driving wires 39, 40a, 40b are mounted around the various pulleys 36a, 36b, 37 and 38a–38g as is generally shown in FIG. 7. However, due to variations in the length of the wires, after initial set-up, the second optical scanner system 10 generally will not be arranged perpendicular to the optical axis of the lens 5. To obtain the requisite perpendicular arrangement, the second optical scanner system 10 is moved until at least one pair of the hole pairs, such as the holes 46a and 44a, are aligned, using a tool 32 as shown in FIG. 10. At this point, the holes 46b and 44b generally will not be aligned. In order to align holes 46b and 44b, the fixing attachment positions of the driving wires 40a, 40b to the stationary bases 41a and 41b are then changed until the holes 46b and 44b are aligned. During the time of aligning the holes 46b and 44b, the tool 32 is inserted into the both holes 46b and 44b. After this, the tool 32 is pulled out from the holes 46b and 44b. When pulling out the tool 32, if the second optical scanner system 10 can maintain its position, the alignment is accomplished. And then the tool 32 is inserted into the both holes 46b and 44b again. The second optical scanner system 10, having its reference holes 46a and 46b respectively aligned with the reference holes 44a and 44b of the lens base 27, will be aligned perpendicular to the optical scanning axis.

Thereafter, the aligning points of wires 39, 40a, 40b to the opposite ends of the first optical scanner system 9 are changed until the reference holes 45a and 45b of the first optical scanner system 9 are aligned with the reference holes 43a and 43b of the lens base 27, respectively. During the time of aligning the holes 43a and 43b with the holes 45a and 45b, the tools 33 are inserted into the holes 43a, 45a and 43b, 45b, and the wires 39, 40a, 40b are clamped with the first optical scanner system 9 by the wire clamps 35a and 35b. In this way, the first optical scanner system 9 likewise is aligned perpendicular to the optical scanning axis. After this, four tools 32, 33 are pulled out. Under this state, each of the first and second optical scanner systems 9, 10 is accurately set perpendicular to the optical axis of the lens 5, and parallel to each other. Accordingly, in this embodiment, the setting of position relationship between the first and second optical scanner system 9, 10 can be done easily. Even though in this embodiment both sides of the first and second optical scanner systems 9, 10 are driven, without using a guide rod, the perpendicular angle between the first and second optical scanner system 9, 10 and the optical axis of the lens 5 can be accurately produced. Further, the frictional load between the guide rod and the bearings can be eliminated because the guide rod is not used.

Figure 11:
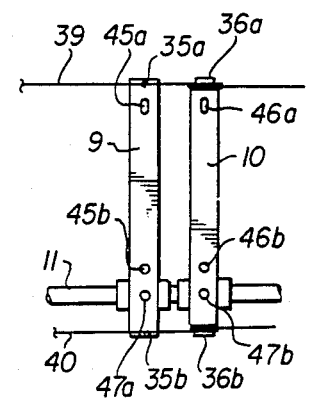
FIG. 11 is a schematic plan view showing another example of the driving system of the apparatus of the invention; and , FIG. 12 a schematic side view of another embodiment of the document scanning apparatus of the invention.

Now, it can be understood from the first and second embodiments of the present invention that the present invention can be applied to an optical scanner which utilizes both an opposite sides driving system and which includes a guide rod. In this case, the perpendicular angle between the optical scanner systems and the lens 5 may be produced by the perpendicular angle of the mirror support member against the guide rod support parts like in the first embodiment of the present invention, but the structure of the second embodiment of the present invention may be used. In order to do this, the first and second optical scanner systems 9, 10 are designed to be freely rotatable around respective fulcrums 47a and 47b as shown in FIG. 11. The fulcrums 47a and 47b are formed on the center line of the guide rod 11. Accordingly, the use of the guide rod 11 can prevent vertical moving of the first and second optical scanner systems 9, 10 during a scanning time.

Figure 12:
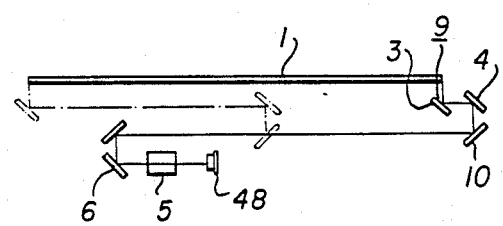

From the foregoing description, it will be appreciated that the invention is not limited to the copying machines but is applicable to the image scanner or the like in which the image of the original is formed on an image pick-up device, such as CCD 48 (Charge Coupled Device) to form electric signals corresponding to the original image, as shown in FIG. 12.

As described hereinabove, according to the present invention, the lens moving mechanism and mirror moving mechanism are independent from the moving mechanism for the first and second optical scanner systems, that is, the optical scanning wire system is separated from the focus and magnification ratio changing systems, whereby the movement of the focus and magnification changing systems are stabilized, and in the case of a wire replacement, for example, due to broken wire, wire stretch or the like, mere adjustment such that the reference holes of the optical scanner systems are coincident with the reference holes of the lens base by using a tool can accurately reproduce the original factory set condition in the field.

Obviously, numerous modifications and variations of the present invention are possible in light of the above teachings. For example, an optical or electric sensor which detects the coincidence of the reference points of the optical scanner systems with the reference points of the lens support member may be applicable to the above mentioned embodiments. It is therefore to be understood that within the scope of the appended claims, the invention may be practiced otherwise than as specifically described herein.

What is claimed as new and desired to be secured by Letters Patent of the United States is:

1. A document scanning apparatus comprising:
    a light source for illuminating an original document to be copied with an elongated light beam defining a longitudinal axis;
    first and second optical scanner systems coupled optically in series for transmitting an image of an original to a predetermined location, said light source mechanically coupled to said first optical scanner system;
    a lens defining an optical axis and supported on a lens support member, said first and second optical scanner systems transmitting an image transmitted to said lens;
    means for aligning said lens and said first and second optical scanner systems, comprising,
    first means for defining a first reference point on said lens support member,
    second means for defining a second reference point on said lens support member,
    third means for defining a third reference point on said first optical scanner system,
    fourth means for defining a fourth reference point on said second optical scanner system;
    wherein when said first reference point is aligned with said third reference point and second second reference point is aligned with said fourth reference point, said first and second optical scanner systems are aligned with said lens.

2. A document scanning apparatus according to claim 1, wherein said first, second, third and fourth defining means each comprise an alignment hole.

3. A document scanning apparatus according to claim 2, comprising:
    at least one tool for aligning the holes of said first and third defining mens and the holes of said second and fourth defining means.

4. A document scanning apparatus according to claim 1, comprising:
    said first and second optical scanner systems comprising respective mirrors, said elongated light beam reflected off said original to a mirror of said first optical scanner system and from said first optical scanner system to a mirror of said second optical scanner system,
    said third reference point located on a line coincident with the longitudinal axis of said light beam where said light beam is reflected off said mirror of said first optical scanner system, and
    said fourth reference point located on a line coincident with the longitudinal axis of said light beam where said light beam is reflected off the mirror of said second optical scanner sytem.

5. A document scanning apparatus according to claim 1, further comprising:
    means for driving said first and second optical scanner systems, including at least first and second pulleys and a wire turning over said pulleys and connecting said first and second optical scanner systems.

6. A document scanning apparatus according to claim 5, wherein said driving means comprises:
    a third pulley fixed at one end of said second optical scanner system, said wire turned over said third pulley and connected with one end of said first optical scanner system such that upon driving of said wire and said first optical scanner system at a predetermined speed, said second optical scanner system is driven at half said predetermined speed.

7. A document scanning apparatus according to claim 1, further comprising:
    means for selecting a magnification of said image of said original,
    a mirror for reflecting the light passed through said lens and leading said light to a predetermined location,
    mirror moving means for moving said mirror to change a magnification of the image of said original,
    lens moving means for moving said lens support member to change said magnification in relation with a movement of said mirror.

8. A document scanning apparatus according to claim 7, further comprising:
    means for detecting the position of said lens and controlling said lens moving means to position said lens at a predetermined standard location.

9. A document scanning apparatus according to claim 1, comprising:
a guide rod extending parallel to a scanning direction of said first and second optical scanner systems for guiding said first and second optical scanner systems thereon, said first and second optical scanner systems coupled to said guide rod and including mirrors extending perpendicularly away from said guide rod such that said mirrors are maintained perpendicular to the optical axis of said lens.

10. A document scanning apparatus according to claim 1, further comprising:
first driving means coupled to respective ends of said first and second optical scanner systems for moving said first and second optical scanner systems reciprocately; and
second driving means coupled to respective opposite ends of said first and second optical scanner systems for moving said first and second optical scanner systems reciprocately.

11. A document scanning apparatus according to claim 10, wherein each of said first, second, third and fourth defining means comprises plural reference points positioned such that a straight lines between the reference points of each defining means is perpendicular to the optical axis of said lens.

12. A document scanning apparatus according to claim 11, wherein said first, second, third and fourth defining means each have respective reference points and said optical axis is between said respective reference points.

13. A document scanning apparatus according to claim 10, wherein said first and second drive means comprise:
respective pulleys mounted at oposite ends of said second optical scanner system; and
first and second driving wires coupling respective of said pulleys, said first driving wire fixedly connected to one end of said first optical scanner system, said second driving wire fixedly connected to an opposite end of said first optical scanner system.

14. A document scanning apparatus according to claim 10, further comprising:
a guide rod extending parallel to a scanning direction of said first and second optical scanner systems for supporting and guiding said frist and second optical scanner systems thereon.

15. A document scanning apparatus according to claim 14, wherein said first and second optical scanner system comprise:
support members for pivotally supporting said first and second optical scanner systems, said support members being slidably engaged with said guide rod.

16. A document scanning apparatus according to claim 11, comprising:
at least one tool for aligning the holes of said first and third defining means and the holes of second and fourth defining means.

17. A document scanning apparatus according to claim 10, comprising:
said first and second optical scanner system comprising respective mirrors,
said elongated light beam reflected off said original to a mirror of said first optical scanner system and from said first optical scanner system to a mirror of said second optical scanner system,
said third reference point located on a line coincident with the longitudinal axis of said light beam where said light beam is reflected off said mirror of said first optical scanner system, and
said fourth reference point located on a line coincident with the longitudinal axis of said light beam where said light beam is reflected of the mirror of said second optical scanner system.

18. A document scanning apparatus according to claim 1, further comprising:
a mirror for reflecting light transmitted from said second optical scanner system through said lens; and
light receiving means positioned at said predetermined location for receiving said image transmitted through said lens and reflected off said mirror.

* * * * *